United States Patent

Tanaka et al.

[11] Patent Number: 5,336,524
[45] Date of Patent: Aug. 9, 1994

[54] EVAPORATOR

[75] Inventors: Noriyuki Tanaka; Takashi Takishita; Kiyoshi Fukushima; Yasuyuki Nagakura, all of Konan; Kaoru Inoue, Fuchu; Tsuyoshi Nishijima, Fuchu; Haruhiro Inada, Fuchu, all of Japan

[73] Assignee: Diesel Kiki Co., Ltd., Tokyo, Japan

[21] Appl. No.: 999,782

[22] Filed: Dec. 30, 1992

Related U.S. Application Data

[60] Continuation of Ser. No. 866,663, Feb. 28, 1992, abandoned, which is a continuation-in-part of Ser. No. 687,054, Apr. 18, 1991, abandoned, which is a division of Ser. No. 432,219, Nov. 6, 1989, abandoned.

[30] Foreign Application Priority Data

Nov. 8, 1988 [JP] Japan .................... 63-282689

[51] Int. Cl.$^5$ ............................... B05D 3/12
[52] U.S. Cl. .................... 427/240; 427/309; 427/346; 427/376.2; 427/397.7; 427/397.8; 427/443.2
[58] Field of Search ............ 427/397.8, 309, 346, 427/397.7, 443.2, 240, 376.2

[56] References Cited

U.S. PATENT DOCUMENTS

| 2,801,938 | 8/1957 | Iler | 427/397.8 |
| 3,326,715 | 6/1967 | Twells | 427/397.8 |
| 4,421,789 | 12/1983 | Kaneko et al. | 427/204 |
| 4,888,213 | 12/1989 | Hesterberg | 427/346 |

FOREIGN PATENT DOCUMENTS

| 53-77372 | 7/1978 | Japan | 165/133 |
| 57-162605 | 10/1982 | Japan . | |
| 61-276697 | 12/1986 | Japan . | |

OTHER PUBLICATIONS

Hockh's Chemical Dictionary 4th ed. p. 721.
The Condensed Chemical Dictionary 10th ed p. 951, 952, 1003.

Primary Examiner—Shrive Beck
Assistant Examiner—Benjamin L. Utech
Attorney, Agent, or Firm—Charles S. McGuire

[57] ABSTRACT

A method of applying to surfaces of component parts of an evaporator hydrophilic coatings which do not emit offensive odors under operating conditions, or at other times. The method provides coatings in which water glass and colloidal silica are attached to the surfaces in the form of solids in an amount of 0.010 to 0.066 g/m$^2$.

5 Claims, 3 Drawing Sheets

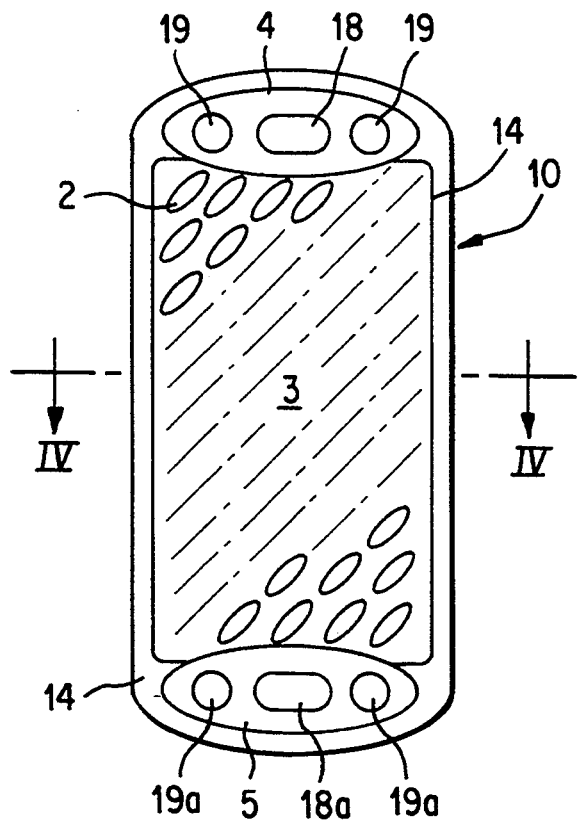
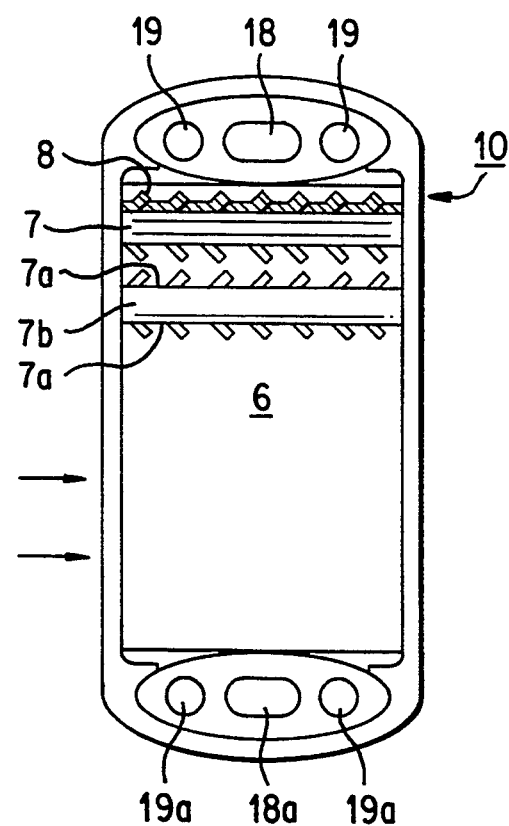
FIG. 2    FIG. 3
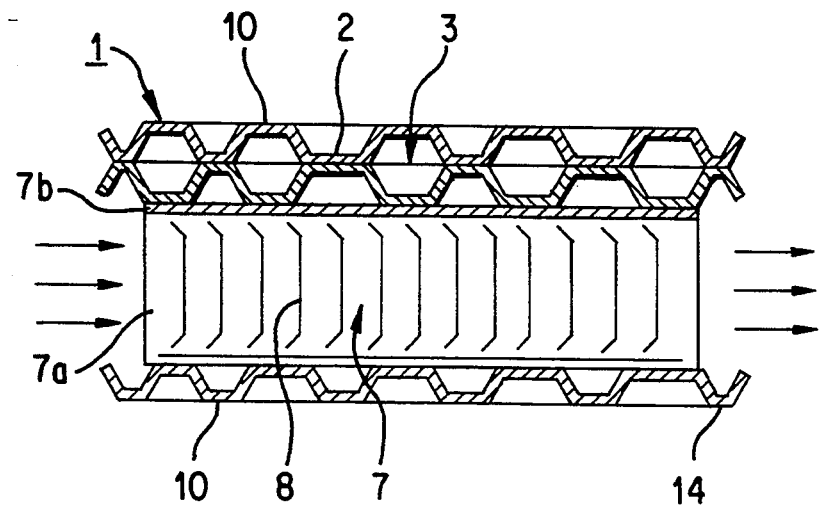
FIG. 4

EVAPORATOR

REFERENCE TO RELATED APPLICATIONS

The present application is a continuation of Ser. No. 07/866,663, filed Feb. 28, 1992, now abandoned, which was a continuation-in-part of Ser. No. 07/687,054, filed Apr. 18, 1991, now abandoned, which was a division of Ser. No. 07/432,219, filed Nov. 6, 1989, now abandoned.

BACKGROUND OF THE INVENTION

This invention relates to a method of providing coatings on component parts of an evaporator for use in air-conditioning systems for automotive vehicles.

Conventionally, an evaporator of this kind has been proposed in Japanese Provisional Patent Publication (Kokai) No. 57-162605. This evaporator is a laminate type comprising a plurality of tube elements, each of which is composed of a pair of stamped plates joined together in a face-to-face manner to define refrigerant-evaporating passages therebetween, and a plurality of corrugated fins interposed between adjacent tube elements to divide a space between the adjacent tube elements into a plurality of air passages, the tube elements and the corruated fins being superposed one upon another in an alternate manner and united together by brazing. The outer surfaces of the tube elements and the corrugated fins are coated with hydrophilic coating layers. The hydrophilic coating layers are formed by immersing the tube elements and the corrugated fins in a bath of an aqueous solution containing water glass and macromolecular silica, and then heating them to dry.

The laminate type evaporator is intended to have improved hydrophilic property of the surfaces of the corrugated fins and tube elements by coating same with the hydrophilic coating layers so as to cause condensate to be deposited on the surfaces in a flat form to thereby reduce the resistance of the condensate itself to the air flow and improve the adherability and mobility of the condensate on the surfaces, while restraining formation of bridges of the condensate between bent portions of the corrugated fins.

If the concentration of water glass and colloidal silica in the bath is made higher, the water glass (alkali silicate) $K_2O \cdot 3SiO_2$ and colloidal silica $SiO_2$ deposited on the surfaces of the tube elements and corrugated fins have increased weight per unit area after drying by heating. The hydrophilic property of the outer surfaces of the tube elements and corrugated fins is enhanced with increase in the amount of silicon dioxide $SiO_2$ contained in the solid deposition to contribute to prevention of scattering of the condensate. More specifically, it is generally recognized that the smaller a contact angle $\theta$ formed between the surface of a solid object and the surface of a liquid drop on the solid object (an angle formed at a point where the surface of a liquid drop is in contact with the surface of a solid object between a tangent to the liquid drop surface at the point and the solid object surface), the more excellent the hydrophilic property of the surface of the solid object. As the $SiO_2$ content in the solid deposition is higher, the angle $\theta$ becomes smaller as shown in FIG. 6A, and accordingly the hydrophilic property of the outer surfaces of the tube elements and corrugated fins becomes more excellent, whereas as the $SiO_2$ content in the solid deposition is lower, the angle $\theta$ becomes larger as shown in FIG. 6B, and accordingly the hydrophilic property becomes poorer.

However, if the $SiO_2$ content is too high, not only moisture but also an offensive smell is attached to the outer surfaces of the corrugated fins and tube elements during operation of the air-conditioning system of the automotive vehicle. When the air-conditioning system is stopped, there occurs exhalation of not only the moisture but also the offensive smell attached to the surfaces. As a result, the offensive smell is fed into the car compartment. Therefore, it is necessary to limit the content of water glass and colloidal silica in the hydrophilic coating layers formed on the outer surfaces of the tube elements and corrugated fins of the evaporator within such a range as to contribute to prevention of scattering of the condensate and at the same time prevention of occurrence of the offensive smell.

SUMMARY OF THE INVENTION

It is the object of the invention to provide an evaporator which is almost completely free of scattering of the condensate as well as exhalation of an offensive smell.

To attain the above object, a process for forming odor-free and hydrophilic coating layers n surfaces of component parts of an evaporator, comprising the steps of:

a) immersing an assembly of the component parts in an aqueous solution containing water glass and colloidal silica having a predetermined solids concentration, the ratio in solids content between the water glass and the colloidal silica being 10-50% by weight water glass and 50-90% by weight colloidal silica;

b) removing the assembly from the aqueous solution, and subjecting the assembly to centrifugal separation to such an extent that an amount of the aqueous solution attached to the surface of the assembly is reduced to a predetermined value; and c) drying the assembly by heating same at a predetermined temperature for a predetermined period of time so that the water glass and colloidal silica are attached to the surfaces in the from of solids in an amount within a range of 0.010 to 0.066 g/m².

Preferably, the ratio in solids content between the water glass and the colloidal silica is 20% by weight water glass and 80% by weight colloidal silica.

The above and other objects, features and advantages of the invention will be more apparent from the ensuing detailed description taken in conjunction with the accompanying drawings.

BRIEF DESCRIPTION OF THE DRAWINGS

FIG. 2 is a cross-sectional view taken along II—II in FIG. 1;

FIG. 3 is a cross-sectional view taken along III—III in FIG. 1;

FIG. 4 is a cross-sectional view taken along IV—IV in FIG. 2;

DETAILED DESCRIPTION

The invention will now be described in detail with reference to the drawings showing an embodiment thereof.

Figure 1:
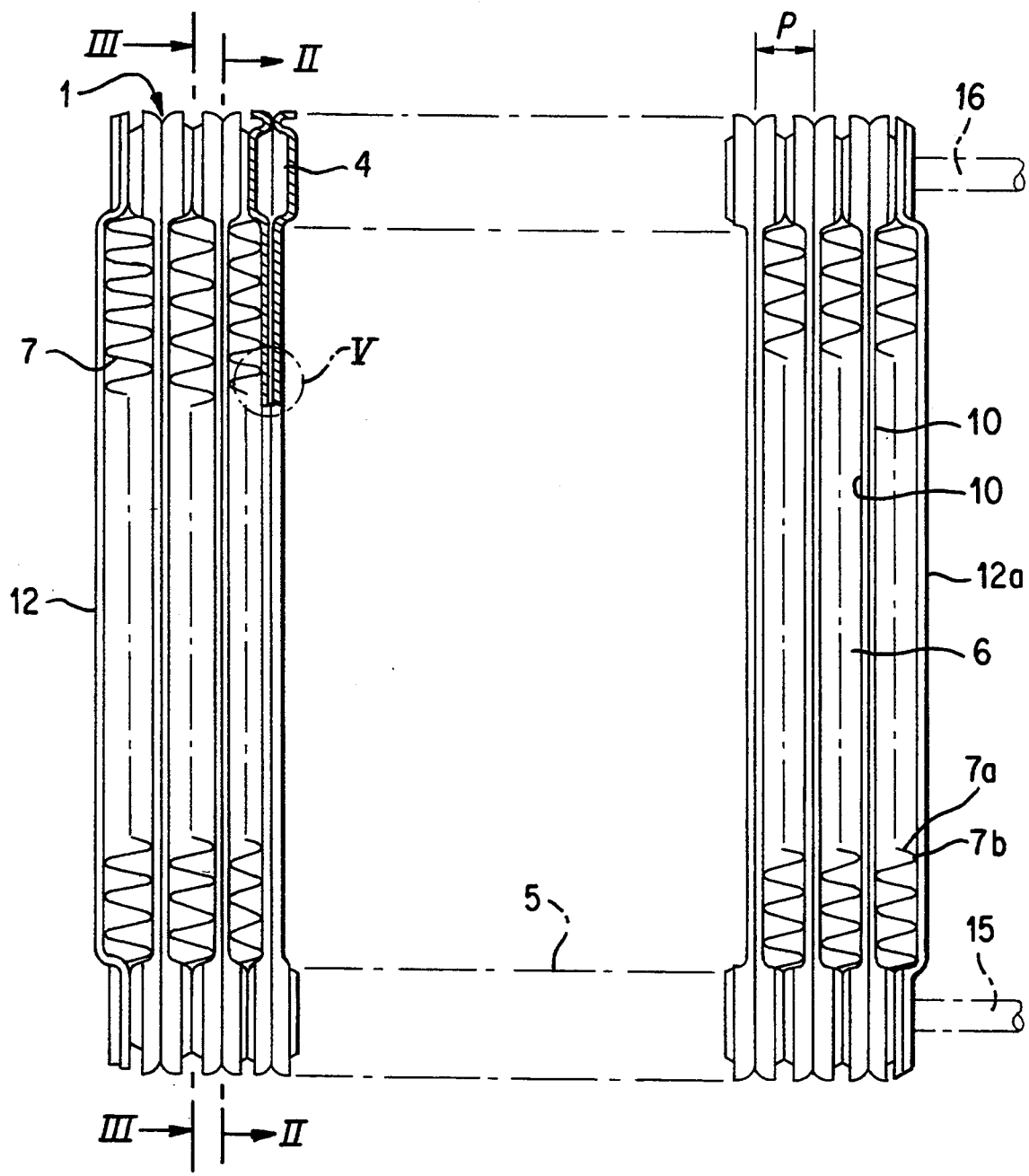
FIG. 1 is a longitudinal cross-sectional view of an evaporator according to one embodiment of the invention.

FIGS. 1 to 5 show a laminate type evaporator according to the embodiment of the inveniton. As shown in FIG. 1, the laminate type evaporator comprises a number of tube elements 1, each of which is composed of a pair of stamped plates 10, 10 joined together in a face-to-face manner to form a multiplicity of refrigerant-evaporating passages 3 therebetween, the tube elements being stacked one upon another with a pitch P between each pair of adjacent tube elements 1, corrugated fins 7 each interposed between each pair of adjacent tube elements, and a pair of end plates 12, 12a attached to outermost ones of the tube elements at the opposite ends. The evaporator is so disposed that cooling air is introduced into the evaporator in a direction perpendicular to the plane of FIG. 1 to pass through air passages defined through the corrugated fins 7. In each tube element 1, as shown in FIGS. 2 and 3, the paired stamped plates 10, 10 define therebetween the refrigerant-evaporating passages 3 at an intermediate portion thereof, a refrigerant outlet chamber 4 at an upper end thereof which is communicated with the refrigerant-evaporating passages 3, and a refrigerant inlet chamber 5 at a lower end thereof which is communicated with the refrigerant-evaporating chamber 3. The outer surface of a side wall of the tube element 1 is spaced from the outer surface of a side wall of an adjacent tube element 1 to define an air passage-forming space 6 therebetween, which is divided by corrugated fins 7 secured to the adjacent outer side walls of tube elements 1, 1 into a number of air passages through the corrugated fins 7. In the present embodiment, a multiplicity of protuberances 2 are formed on the inner surfaces of the stamped plates 10, 10, and define the refrigerant-evaporating passages 3 therebetween within the paired stamped plates joined together. Each stamped plate 10 is Generally oblong and symmetrical in shape with respect to the center thereof, and provided with an annular continuous protruded peripheral edge. A pair of stamped plates 10 are joined together by brazing the surfaces of the annular continuous protruded peripheral edges and the protuberances 2 abutting on each other. The refrigerant outlet chamber 4 is provided with a central communicating hole 18 and communicating holes 19, 19 on either side of the former 18. Similarly, the refrigerant inlet chamber 5 is provided with a central communicating hole 18a and communicating holes 19a, 19a on either side of the former 18a. The end plates 12, 12a are similar in shape to the stamped plate 10 except that they have no communicating hole formed therein. As shown in FIGS. 1, 3, and 4, the corrugated fin 7 is prepared by folding a sheet of a metal into a wave-like or corrugated form, and bent portions 7b of the corrugated sheet are brazed to the outer surfaces of the side walls of the adjacent stamped plates 10, 10. The corrugated fin 7 has straight portions 7a dividing the air passage-forming space 6 between the adjacent stamped plates 10, 10 into the air passages. The straight portions 7a have cuts in the form of louvers 8 so that air flows between the adjacent air passages by way of the openings of the louvers 8.

The laminate type evaporator having the above construction is fabricated as follows: First, component parts such as stamped plates 10, end plates 12, 12a and corrugated fins 7 are prepared by stamping sheets of a metal which has high thermal conductivity, e.g. aluminum, into respective shapes. Then, the surfaces of the component parts thus formed are coated with a brazing material. The component parts are then assembled and held in the assembed state by means of a suitable jig (not shown). Next, the assembly is heated under a predetermined brazing atmosphere so that the brazing material is melted to join the contact portions of the component parts together.

Figure 5:
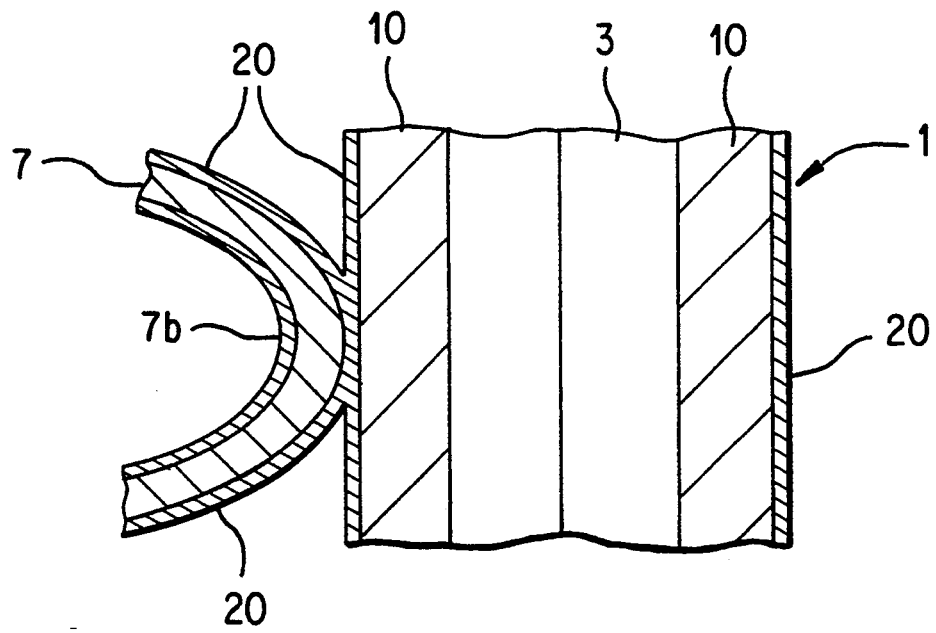
FIG. 5 is an enlarged fragmentary sectional view of a portion indicated by V in FIG. 1.
Figure 6A:
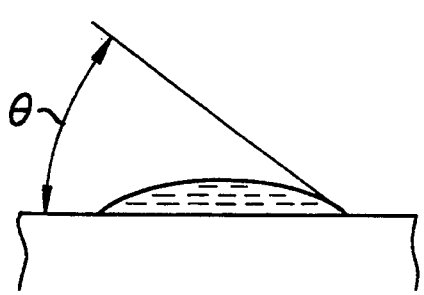
FIGS. 6A and 6B are diagrams useful in explaining the hydrophilic property of a solid object surface.
Figure 6B:
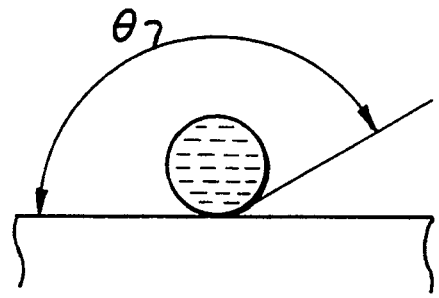

Then, as shown in FIG. 5, the outer surfaces of the tube elements 1 and the corrugated fins 7 assembled are coated with hydrophilic coating layers 20 by means of a hydrophilic property-imparting treatment.

The hydrophilic property-imparting treatment is carried out in the following manner:

The assembly of the component parts, i.e., the tube elements and the corrugated fins brazed together, is immersed in an aqueous solution containing water glass and colloidal silica having a predetermined solids concentration, preferably, within a range of 0.62 to 3.08 g/l. Then, the assembly is removed from the aqueous solution, and subjected to centrifugal separation to such an extent that an amount of the aqueous solution attached to the surfaces of the assembly is reduced to a predetermined value, preferably, 16 to 22 g/m$^2$.

As the water glass contained in the above aqueous solution, potassium silicate having a chemical formula of $K_2O.3SiO_2$ is preferable. However, this is not limitative, but any alkali silicate heretofore known in the art, such as sodium silicate, may be used.

The ratio in solids content between water glass and colloidal silica in the stock solution is 10-50% by weight water glass and 90-50% by weight colloidal silica, and preferably, 20% by weight water glass and 80% by weight colloidal silica.

If the ratio of water glass is smaller than 10% by weight (the ratio of colloidal silica is greater than 90% by weight), colloidal silica attached to the surfaces of the assembly of the tube elements 1 and the corrugated fins 7 is liable to exfoliate, resulting in degraded hydrophilic property, since on the coated surfaces the water glass surrounds the colloidal silica to act as the bonding agent, whereas if the ratio of water glass is greater than 50% by weight (the ratio of colloidal silica is smaller than 50% by weight), part of the water glass attached to the surfaces of the assembly of the tube elements 1 and the corrugated fins 7 is dissolved into the condensate on the surfaces of the evaporator, and is carried away together with part of the colloidal silica by the condensate, also resulting in degraded hydrophilic property.

Preferably, before the coating operation the assembly should be immersed in an etching solution to clean the assembly, washed with water, and then coated with chromic acid anodic oxide coating.

An example of the hydrophilic property-imparting treatment will be described hereinbelow.

First, the assembly of the tube elements 1 and the corrugated fins 7 brazed together as described above is immersed in an etching bath containing an etching solution to clean same and prevent the surfaces of the component parts from being oxidized, followed by washing the assembly with water to remove the etching liquid therefrom. Then, the surfaces of the component parts are coated with chromic acid anodic oxide coating to prevent corrosion thereof.

The above steps are repeated several times.

Then, the assembly of the tube elements 1 and corrugated fins 7 is immersed in a bath containing an aqueous solution of water glass $K_2O \cdot 3SiO_2$ and colloidal silica $SiO_2$. The solution is prepared by diluting a stock solution, i.e. a mixture of water-glass and colloidal silica, with water into a concentration of 2 g/l–10 g/l. The solids content of water glass and colloidal silica in the stock solution is 30.8%, with the ratio in solids content between water glass and colloidal silica being 10–50% by weight water glass and 90–50% by weight colloidal silica and therefore the solids concentration of water glass and colloidal silica in the bath solution is 0.62 g/l to 3.08 g/l.

After the immersion, the assembly is placed into a centrifugal separator, and the centrifugal separator is rotated at a predetermined rotational speed and at a room temperature for a predetermined period of time so that the bath solution of water glass and colloidal silica attached to the assembly of tube elements 1 and corrugated fins 7 is reduced to 60 to 80 g per one assembly or evaporator. In other words, if the surface area of one evaporator is 3.7 m², the amount of the attached bath solution per unit area is 16 to 22 g/m².

Finally, the assembly or evaporator is dried in a drying chamber at a temperature of 130° C. for 20 minutes. As a result, if the concentration of the bath solution is set at 2 g/l, the amount of solid water glass and solid colloidal silica attached to the tube elements 1 and the corrugated fins 7 is 0.010 to 0.013 g/m², while if the concentration of the bath solution is set at 10 g/l, the amount of same is 0.050 to 0.066 g/m².

After the drying, a water-scattering test and an offensive smell test were carried out on assemblies of tube elements 1 and corrugated fins 7 which were different in the amount of solid water glass and solid colloidal silica attached thereto. The results are shown in Table. Here, the amount Q (g/m²) of the solids attached is determined by the following equation:

$$Q = \frac{C \times S \times B}{1000 \times G \times A},$$

where C represents the bath solution concentration (g/l), S the solids content of stock solution (%/100), B the amount of attached bath solution (g), G the specific gravity of bath solution (kg/l), and A the surface area (m²) of the evaporator, respectively.

in which an offensive smell is attached to the laminate type evaporator, and the exhaled smell is examined similarly. The offensive smell is attached to the laminate type evaporator by placing a dished container containing a solution exhaling an offensive smell, the solution containing acetic acid (16700 ppm), propionic acid (1700 ppm), i-butyric acid (1700 ppm), n-butyric acid (1700 ppm), i-valeric acid (1700 ppm), and n-valeric acid (1700 ppm), into a closed vessel the inside temperature of which is kept at 30° C., and then placing the laminate type evaporator cooled to −30° C. into the vessel, followed by holding for 12 to 13 hours. Thus, the offensive smell-exhaling solution is volatilized to attach the offensive smell to the laminate type evaporator. The numerical values in the columns of the offensive smell test indicate intensity values of offensive smell in accordance with the six-stage offensive smell intensity indication method (the offensive smell intensity is indicated by numerical values 0 to 5 corresponding respectively to different degrees of olfactory sensation) prescribed by the Environmental Agency of Japan.

As shown in Table, as to an evaporator with an amount of attached solid water glass and solid colloidal silica of 0.005 to 0.007 g/m², the results of the offensive smell test showed that there was no problem in respect of the degree of offensive smell, since the offensive smell intensity value was less than 1.0. However, the condensate scattered away was great according to the results of the water-scattering test. On the other hand, with respect to evaporators with amounts of attached solid water glass and solid colloidal silica of 0.099 to 0.654 g/m², the results of the water-scattering test and the offensive smell test under an offensive smell not attached condition showed that they had no problem. However, the offensive smell test under an offensive smell attached condition showed offensive smell intensity values of 3.0 (an offensive smell can be easily perceived) or higher. In contrast, with respect to evaporators with amounts of attached solid water glass and solid colloidal silica of 0.010 to 0.066 g/m², the results of the water-scattering test were good, and the results of the offensive smell tests under both an offensive smell not attached condition and an offensive smell attached condition were good, showing offensive smell intensity values of less than 2.0 (the offensive smell is week but can be discriminated).

As described above, it is clear from the results of the

TABLE

| BATH SOLUTION CONCENTRATION (g/l) | AMOUNT OF SOLID WATER GLASS AND SOLID COLLOIDAL SILICA ATTACHED (g/m²) | WATER-SCATTERING TEST | OFFENSIVE SMELL TEST | | | |
|---|---|---|---|---|---|---|
| | | | TEST UNDER AN OFFENSIVE SMELL NOT ATTACHED CONDITION | | TEST UNDER AN OFFENSIVE SMELL ATTACHED CONDITION | |
| | | | A/C OFF | A/C ON | A/C OFF | A/C ON |
| 1 | 0.005~0.007 | NOT GOOD | 0 | LESS THAN 1.0 | 1.0 | 1.0 |
| 2 | 0.010~0.013 | GOOD | 0 | LESS THAN 1.0 | 1.0 | 1.0 |
| 5 | 0.025~0.033 | GOOD | 0 | LESS THAN 1.0 | 1.5 | 1.0–1.5 |
| 10 | 0.050~0.066 | GOOD | 0 | LESS THAN 1.0 | 2.0 | 1.5–2.0 |
| 20 | 0.099~0.132 | GOOD | 0 | 1.0–1.5 | 3.0 | 3.0 |
| 50 | 0.247~0.330 | GOOD | 0 | 0.5–1.0 | 3.0 | 3.5 |
| 100 | 0.490~0.654 | GOOD | 0 | 1.0–2.0 | 3.0~3.5 | 3.0–3.5 |

In Table, the test under an offensive smell not attached condition is a test in which no offensive smell is attached to a laminate type evaporator in advance, and the intensity of offensive smell exhaled is examined when the air-conditioning system (A/C) is started and stopped, and when it is kept inoperative, whereas the test under an offensive smell attached condition is a test water-scattering test and the offensive smell test that the optimum amount of attached solid water glass and solid colloidal silica is 0.010 to 0.066 g/m².

Next, the operation of the laminate evaporator having the above-described construction will be described. The adjacent refrigerant inlet chambers 5 of the tube elements 1 are communicated with each other through the communicating holes 18a, and similarly the adjacent refrigerant outlet chambers 4 of same are communicated with each other through the communicating holes 18, whereas only the tube elements at the opposite ends of the evaporator are closed by the end plates 12, 12a. The refrigerant inlet and outlet ports 5, 4 are connected to a refrigerating circuit, not shown, by way of conduits 15, 16, respectively. Liquefied refrigerant is introduced into the refrigerant inlet chamber 5 of each tube element 1 by way of the conduit 15, and then drawn into the refrigerant-evaporating passages 3, in which the refrigerant is evaporated while being dispersed and mixed until it reaches the refrigerant outlet chamber 4. Thus, the refrigerant upwardly flowing through the refrigerant-evaporating passages 3 vaporizes while absorbing heat of introduced air by way of the corrugated fins 7 or directly from the stamped plates 10. After having reached the refrigerant outlet chamber 4, the refrigerant is drawn into the conduit 16 by a compressor, not shown. In the meanwhile, the cooling air introduced into the air passage-forming space 6 by a blower, not shown, is cooled while flowing in the direction of the arrows shown in FIGS. 3 and 4 along the corrugated fins 7 between the adjacent tube elements 1, 1, part of the cooling air being directed into adjacent air passages through the openings of the louvers 8.

In the above-described embodiment of the laminate type evaporator, the amount of attached solid water glass and solid colloidal silica is limited within the range of 0.010 to 0.066 g/m$^2$. Therefore, offensive smell is hardly attached to the surfaces of the evaporator, and no offensive smell is exhaled when the condensate is evaporated. At the same time, the condensate is attached to the surfaces of the evaporator in the form of flat drops, which contribute to improved adherability of the condensate, whereby release of the condensate from the outer surfaces of the tube elements and corragated fins caused by the air introduced can be prevented. Therefore, offensive smell can be prevented from being fed into the car compartment and at the same time scattering of water can be prevented.

Although, in the above described embodiment, the invention is applied to a laminate type evaporator having two groups of tank chambers at upper and lower ends thereof, this is not limitative, and the invention may also be applied to other types, such as a non-laminate type or a single tank type.

What is claimed is:

1. A process for forming odor-free and hydrophilic coating layers on surfaces of component parts of an evaporator, comprising the steps of:
    a) immersing an assembly of said component parts in an aqueous solution consisting essentially of water glass, colloidal silica, and water, the ratio in solids content between said water glass and said colloidal silica being 10–50% by weight water glass and 50–90% by weight colloidal silica;
    b) removing said assembly from said aqueous solution, and subjecting said assembly to centrifugal separation to such an extent that the amount of said aqueous solution attached to surfaces of said assembly is reduced to a level such that said assembly may be dried by heating until said water glass and colloidal silica are attached to said surfaces of said assembly in the form of solids in an amount within a range of 0.010 to 0.066 g/m$^2$; and
    c) drying said assembly by heating same at a temperature for a period of time until said water glass and colloidal silica are attached to said surfaces of said assembly in the form of solids in an amount within a range of 0.010 to 0.066 g/m$^2$.

2. A process as claimed in claim 1, and prior to the step of immersing said assembly of said component parts in said aqueous solution, further including the steps of immersing said assembly in an etching solution to clean said assembly, washing said assembly with water, and coating said assembly with chromic acid anodic oxide coating.

3. A process as claimed in claim 1, where the ratio in solids content between said water glass and said colloidal silica is 20% by weight water glass and 80% by weight colloidal silica.

4. A process as claimed in claim 1 wherein the solids concentration of said aqueous solution is within the range of 0.62 to 3.08 g/l.

5. A process as claimed in claim 4 wherein said aqueous solution attached to surfaces of said assembly is reduced by said centrifugal separation to a level within the range of 16 to 22 g/m$^2$.

* * * * *